United States Patent Office 3,457,317
Patented July 22, 1969

3,457,317
PREPARATION OF ADAMANTANE
Hermann Hoffmann, East Greenwich, and Claude H. Trottier, Lincoln, R.I., assignors, by mesne assignments, to Farbwerke Hoechst AG, vormals Meister Lucius & Bruning, Frankfurt am Main, Germany
No Drawing. Filed Aug. 31, 1967, Ser. No. 664,612
Int. Cl. C07c *13/28, 5/24*
U.S. Cl. 260—666                 14 Claims

ABSTRACT OF THE DISCLOSURE

There is disclosed herein a process for the preparation of adamantane by isomerizing a saturated tricyclic hydrocarbon of 10 carbon atoms in the presence of a Friedel-Crafts catalyst and an organic co-catalyst at a temperature between about —15° C. and about 100° C. without the addition of a free hydrohalogen acid and in the absence of a solvent.

---

This invention relates to the preparation of adamantane, and more particularly, to the preparation of adamantane by the isomerization of a tricyclic hydrocarbon containing 10 carbon atoms in the presence of a catalyst system of a Friedel-Crafts catalyst and an organic co-catalyst.

The synthesis of adamantane (I) by the isomerization of tetrahydrodicyclopentadiene (II) has been reported in several papers.

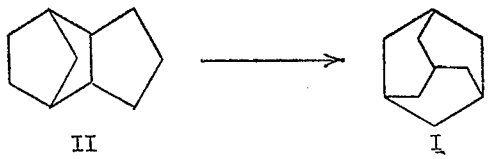

Adamantane is obtained, according to Org. Syntheses, 42, 8 (1963), in moderate yield when tetrahydrodicyclopentadiene is isomerized in the presence of aluminum chloride catalyst at 150° to 180° C. Modifications of that aluminum chloride catalyzed isomerization have also been reported. In one instance, 0.5 mol of tetrahydrodicyclopentadiene is isomerized in the presence of 0.25 mol of aluminum chloride and 0.4 mol of hydrogen chloride in a hydrogen atmosphere at a pressure of 40 atmospheres. The yield of adamantane obtained was 40%, Chemical Abstracts, 55, 21,059i (1961). In another instance, hydrogen fluoride and boron trifluoride were used, and the yield of adamantane obtained was 30%, U.S. Patent No. 2,937,211. In both those processes trans-Decalin was formed as a byproduct of the desired isomerization.

According to Tetrahedron Letters, 52, 6445–51 (1966), 0.169 mol of tetrahydrodicyclopentadiene were reacted in the presence of 0.022 mol of aluminum chloride and 0.190 mol of t-butyl bromide. The reaction products, however, were reported to be two bromo-tetrahydrodicyclopentadiene isomers and two unidentified products in lower yields; adamantane was not found. In another attempt the hydrocarbon was isomerized in the presence of aluminum bromide, sec-butyl bromide and hydrogen bromide at room temperature. The yield of adamantane was found to be 26.8%, J. Amer. Chem. Soc., 82, 4647 (1960).

It is an object of this invention to provide an improved process for the preparation of adamantane. It is a further object of this invention to provide an improved process for preparing adamantane by isomerizing a tricyclic hydrocarbon of 10 carbon atoms. Another object is to provide a process for the preparation of adamantane by isomerizing a saturated tricyclic hydrocarbon of 10 carbon atoms in the presence of a catalyst system comprising a Friedel-Crafts catalyst and an organic co-catalyst. These and other objects of this invention will be in part discussed and in part apparent from the following more detailed disclosure.

We have now found, surprisingly in view of the prior work discussed hereinabove, that adamantane can be obtained by the isomerization of a saturated tricyclic hydrocarbon of 10 carbon atoms in the presence of a catalyst system comprising, per mol of the saturated tricyclic hydrocarbon, about 0.2 to about 1 mol of a mixture comprising (a) about 1 to 4 mols of aluminum bromide, or a mixture of aluminum bromide and up to about 50 mol percent of aluminum chloride, and (b) about 1 mol of an organic co-catalyst, at a temperature at the start of isomerization of about —15° C. to about +25° C. and which may rise during the course of the isomerization to a temperature below about 100° C. as the adamantane product begins to crystallize in the reaction medium. The reaction is carried out without the addition of a free hydrohalogen acid, such as hydrogen bromide or hydrogen fluoride, in the absence of a solvent, and preferably at atmospheric pressure. Practical advantages of the process include not having to use a corrosive hydrohalogen acid, an elevated pressure or a high temperature. The preferred tricyclic hydrocarbons of 10 carbon atoms are endo-tetrahydrodicyclopentadiene and exo-tetrahydrodicyclopentadiene.

The amount of the combination catalyst used for the isomerization reaction principally depends upon the activity of the particular combination used and, as noted above, can be varied between about 0.2 and about 1 mol. Preferably, between 0.25 and 0.75 mol, and advantageously between 0.3 and 0.5 mol, of the catalyst combination is used per mol of the hydrocarbon. The molar ratio of the aluminum bromide, or the mixture of aluminum bromide and aluminum chloride, to the organic co-catalyst preferably is between 1.4 and 3.2 mols, especially between 1.8 and 2.5 mols, per mol of the co-catalyst. In some instances it is desirable to add the co-catalyst to the aluminum halide at a temperature between about —15° C. and 0° C., and then to add the hydrocarbon to be isomerized.

Organic co-catalysts suitable for use along with the aluminum bromide or aluminum bromide/aluminum chloride Friedel-Crafts catalyst are organic compounds capable of forming carbonium ions in the presence of the Friedel-Crafts catalyst. Suitable organic co-catalysts are aliphatic halides, for example, alkyl halides of up to about 12 carbon atoms, and advantageously are the alkyl halides of up to about 4 carbon atoms, such as the fluoro-, chloro-, bromo- and iodo-halides of methyl, ethyl, propyl, isopropyl, butyl, isobutyl and t-butyl. In general the alkyl bromides are preferred, and ethyl bromide presently is the most advantageous organic catalyst to use. Other suitable aliphatic halide co-catalysts are allyl halides, such as allyl chloride and allyl bromide, and aliphatic acid halides, for example phosgene and carboxylic acid halides of up to about 6 carbon atoms, e.g., acetyl chloride and acetyl bromide. Other suitable organic co-catalysts include aliphatic alcohols of up to about 6 carbon atoms, such as methanol, t-butanol, hexanol and allyl alcohol, and esters of such alcohols with organic acids such as carboxylic acids of up to about 6 carbon atoms, for example acetic acid and propionic acid, aliphatic sulfonic acids of up to about 6 carbon atoms, for example methane sulfonic acid, aromatic sulfonic acids, for example benzene sulfonic acid and toluene sulfonic acid, and with mineral acids, for example sulfuric acid and phosphoric acid. Ester co-catalysts can be introduced into the reaction vessel as such, or they can be generated in the vessel during the course of the reaction. Aliphatic ethers having up to about 4 carbon atoms in each group attached to the oxygen atom, such as diethyl ether, dimethyl ether and diisopropyl ether, also have been found to be effective organic co-catalysts.

The above-described catalyst systems have been found to be very active in isomerizing the tricyclic hydrocarbon of up to 10 carbon atoms as evidenced by the fact that the isomerization can be initiated at below about room temperature and in many instances can be completed at about room temperature. Moreover, the effect of the combination catalyst system unexpectedly has been found to be very specific in that it enables the preparation of adamantane without formation of significant amounts of by-prdoucts, in contrast to previously reported processes, e.g., Chem. Revs., 64, 277 (1964), in which the formation of numerous by-products was observed.

The reaction mixture of the saturated tricyclic hydrocarbon of 10 carbon atoms and the catalyst system is stirred initially at between about $-15°$ C. to about $+25°$ C., and the temperature can be raised slowly as necessary, until no further increase in the formation of adamantane is observed during a period of from about 1 to about 100 hours. The adamantane formed can then be isolated from the reaction mixture by methods known to persons skilled in the art, for example, by steam distillation or with the help of a solvent, e.g., aromatic and aliphatic hydrocarbons, chlorinated aromatic and chlorinated aliphatic hydrocarbons, and aliphatic alcohols, ethers, esters and ketones. It is also possible, prior to isolating the desired adamantane reaction product, to quench the reaction mixture with water or with an acidic or alkaline aqueous solution.

Adamantane is a valuable intermediate compound that has a variety of uses for making other materials as disclosed in many publications, for example, in Chem. Revs., 64, 277 ff. (1964). Many adamantane derivatives are pharmacologically important because of their physiological activity, e.g., as hypoglycemic and antiviral agents, antibiotics and antiestrogens, and also as pesticides and fungicides. For example, N-arylsulfonyl-N'-adamantyl ureas are potent oral hypoglcemic agents, J. Med. Chem., 6, 760 (1963), as are adamantyl-biguanides, U.S. Patent No. 3,270,036. Alpha-substituted-1-adamantyl-methyl penicillins are known to be antibiotics having activity agains/ pneumococci, streptococci and staphlycocci, Chem. Abs., 66, 28760j (1967).

The following specific examples showing the preparation of adamantane by isomerization are set forth to illustrate the process of this invention.

Example 1

To 10 cc. (0.085 mol) of t-butyl bromide in a 100 ml. round-bottom flask were slowly added, at ice-bath temperature of about $-5°$ C., 45 g. (0.171 mol) of aluminum bromide. The mixture was stirred to form a mobile, dense catalyst system which was allowed to rise to room temperature of about 20° C. to the catalyst were added 50 g. (0.365 mol) of endo-tetrahydrodicyclopentadiene which formed a dense lower phase containing the catalyst and a thinner upper phase. The mixture was magnetically stirred for 24 hours at about 20° C. and the reaction mixture was quenched by adding, at ice-bath temperature, a 10% aqueous sodium hydroxide solution. Thereafter the hydrocarbon was extracted with diethyl ether, the ethereal solution was dried over potassium carbonate, filtered and concentrated. A 62% yield of adamantane, M.P. 268° C. (sealed tube), was thus obtained.

Example 2

Following the procedure described in Example 1, adamantane was prepared from 10 g. (0.074 mol) of endo-tetrahydrodicyclopentadiene in the presence of a catalyst system of 2 cc. (0.017 mol) of t-butyl bromide and 9 g. (0.034 mol) of aluminum bromide. The reaction mixture was stirred and heated at 55° C. for 24 hours, and a 71% yield of adamantane was obtained.

Example 3

To 2 cc. (0.017 mol) of t-butyl bromide were added 4.5 g. (0.017 mol) of aluminum bromide at ice-bath temperature of about $-5°$ C. The mixture was stirred to form a mobile, dense catalyst system which was allowed to rise to room temperature of about 20° C. To the catalyst were added 10 g. (0.074 mol) of endo-tetrahydrodicyclopentadiene after which 2.3 g. (0.017 mol) of aluminum chloride were added slowly. The mixture was stirred for 24 hours at room temperature and then worked up as described in Example 1. A 70% yield of adamantane was obtained.

Example 4

Following the procedure described in Example 1, adamantane was prepared from 10 g. (0.074 mol) of endo-tetrahydrodcyclopentadiene in the presence of a catalyst system of 1.2 cc. (0.017 mol) of ethyl bromide and 9 g. (0.034 mol) of aluminum bromide. The reaction mixture was stirred at room temperature for 24 hours, and a 82% yield of adamantane was obtained.

Example 5

A 250 ml. 3-necked round-bottom flask, fitted with a reflux condenser and an overhead stirrer, was charged at ice-bath temperature of about $-5°$ C. with 10 cc. (0.085 mol) of t-butyl bromide and then 22.6 g. (0.17 mol) of aluminum bromide. 50 g. (0.364 mol) of endotetrahydrodicyclopentadiene were then added to the flask which was removed from the ice bath. The reaction mixture was then stirred for 72 hours at room temperature, worked up as described in Example 1 and provided a 58% yield of adamantane.

Example 6

Following the procedure described in Example 5, adamantane was prepared from 10 g. (0.074 mol) of endo-tetrahydrodicyclopentadiene in the presence of a catalyst system of 8 cc. (0.085 mol) of t-butyl alcohol and 45 g. (0.171 mol) of aluminum bromide. The reaction mixture was stirred at room temperature for 24 hours, and a 44% yield of adamantane was obtained.

Example 7

Following the procedure described in Example 1, adamantane was prepared from 10 g. (0.074 mol) of endo-tetrahydrodicyclopentadiene in the presence of a catalyst system of 1.1 cc. (0.017 mol) of diethyl ether and 9 g. (0.034 mol) of aluminum bromide. The reaction mixture was stirred at room temperature for 24 hours, and a 40% yield of adamantane was obtained.

Example 8

Following the procedure described in Example 1, adamantane was prepared at room temperature in 24 hours in the presence of various catalyst combinations. The molar ratio of organic co-catalyst to Friedel-Crafts catalyst to tetrahydrodicyclopentadiene was 1:2:4.3. The following table shows the organic co-catalyst and the yield of adamantane.

Table

| Co-catalyst: | Percent adamantane |
|---|---|
| Ethyl bromide | 82 |
| Isopropyl bromide | 32 |
| t-Butyl bromide | 66 |
| Allyl bromide | 64 |
| Adamantyl bromide | 36 |
| Methyl iodide | 55 |
| Methanol | 39 |
| t-Butanol | 44 |
| n-Butyl acetate | 28 |
| n-Ethyl acetate | 29 |
| Dimethyl sulfate | 40 |
| Diethyl ether | 40 |
| Diisopropyl ether | 41 |

We claim:

1. A process for the preparation of adamantane by isomerization of tetrahydrodicyclopentadiene which comprises contacting tetrahydrodicyclopentadiene with, per mol thereof, from about 0.2 mol to about 1 mol of a catalyst system of (a) about 1 mol to about 4 mols of aluminum bromide or a mixture of aluminum bromide and up to about 50 mol percent of aluminum chloride, and (b) about 1 mol of an aliphatic halide of up to about 12 carbon atoms; an aliphatic acid halide of up to about 6 carbon atoms; an aliphatic alcohol of up to about 6 carbon atoms; an ester of an aliphatic alcohol of up to about 6 carbon atoms and a carboxylic acid of up to about 6 carbon atoms, an aliphatic sulfonic acid of up to about 6 carbon atoms, an aromatic sulfonic acid or a mineral acid; or an aliphatic ether having up to about 4 carbon atoms in each group attached to the oxygen atom, said isomerization being conducted in the absence of free hydrohalogenic acid.

2. A process for the preparation of adamantane according to claim 1 wherein said catalyst (b) is methyl, ethyl, propyl, isopropyl, butyl, isobutyl or t-butyl fluoride, chloride, bromide or iodide, adamantyl bromide, allyl bromide, allyl chloride, phosgene, acetyl bromide, acetyl chloride, methanol, t-butanol, hexanol, allyl alcohol, ester of methanol, t-butanol, hexanol or allyl alcohol and acetic acid, propionic acid, methane sulfonic acid, benzene sulfonic acid, toluene sulfonic acid, sulfuric acid or phosphoric acid, diethyl ether, dimethyl ether or diisopropyl ether.

3. A process for the preparation of adamantane according ot clai m1 wherein said isomerization is initiated at is endo-tetrahydrodicyclopentadiene.

4. A process for the preparation of adamantane according to claim 1 wherein said cartalyst system is used in an amount of between about 0.3 mol and about 0.5 mol per mol of said tetrahydrodicyclopentadiene, and contains between about 1.8 mols and about 2.5 mols of said (a) component per mol of said (b) component.

5. A process for the preparation of adamantane according to claim 1 wherein said isomerization is conducted in the absence of a solvent for said tetrahydrodicyclopentadiene.

6. A process for the preparation of adamantane according to claim 1 wherein said isomerization is conducted at about atmospheric pressure.

7. A process for the preparation of adamantane according to claim 1 wherein said isomerization is initiated at a temperature of about —15° C. to about +25° C.

8. A process for the preparation of adamantane according to claim 1 wherein said isomerization is conducted at a temperature below about 100° C.

9. A process for the preparation of adamantane according to claim 1 wherein said isomerization is initiated at a temperature of about —15° C. to about +25° C. and, as adamantane begins to crystallize, then at a temperature below about 100° C.

10. A process for the preparation of adamantane according to claim 1 wherein said catalyst (b) is an alkyl bromide of up to about 4 carbon atoms.

11. A process for the preparation of adamantane according to claim 1 wherein said catalyst (b) is ethyl bromide.

12. A process for the preparation of adamantane according to claim 1 wherein said catalyst (b) is t-butyl bromide.

13. A process for the preparation of adamantane according to claim 1 wherein the adamantane isomerization product is isolated from the reaction medium by steam distillation or by a solvent.

14. A process for the preparation of adamantane according to claim 1 wherein after the isomerization reaction is substantially completed the reaction medium is quenched with water, an acidic aqueous solution or an alkaline aqueous solution at below about room temperature, and thereafter the adamantane product is isolated.

References Cited

Derek J. Cash et al.: Tetrahedron Letters, No. 52, pp. 6445–6451, 1966.

Paul von R. Schleyer et al.: J. Amer. Chem. Soc., 82, pp. 4645–4651, 1960.

DELBERT E. GANTZ, Primary Examiner

V. O'KEEFE, Assistant Examiner